', '

United States Patent [19]

Plowman et al.

[11] Patent Number: 5,654,109
[45] Date of Patent: Aug. 5, 1997

[54] COMPOSITE FUEL CELL MEMBRANES

[75] Inventors: Keith R. Plowman; Timothy J. Rehg, both of Lake Jackson; Larry W. Davis, West Columbia; William P. Carl, Marble Falls; Alan J. Cisar, Cypress; Charles S. Eastland, West Columbia, all of Tex.

[73] Assignee: The Dow Chemical Company, Midland, Mich.

[21] Appl. No.: 497,438

[22] Filed: Jun. 30, 1995

[51] Int. Cl.$^6$ ........................................... H01M 8/00
[52] U.S. Cl. ........................... 429/13; 429/33; 521/27
[58] Field of Search ........................... 429/33, 13; 521/27

[56] References Cited

U.S. PATENT DOCUMENTS

| | | | |
|---|---|---|---|
| 3,282,875 | 11/1966 | Connolly et al. | 260/29.6 |
| 3,607,706 | 9/1971 | Flaremann et al. | 204/296 |
| 3,976,549 | 8/1976 | Falvo | 204/1 R |
| 4,123,336 | 10/1978 | Seko et al. | 204/98 |
| 4,124,458 | 11/1978 | Moeglich | 204/98 |
| 4,172,774 | 10/1979 | Moeglich | 204/151 |
| 4,253,923 | 3/1981 | Lynch et al. | 204/98 |
| 4,329,435 | 5/1982 | Kimoto et al. | 521/38 |
| 4,330,654 | 5/1982 | Ezzell et al. | 526/243 |
| 4,331,521 | 5/1982 | Chisholm et al. | 204/98 |
| 4,332,665 | 6/1982 | Kimoto et al. | 204/296 |
| 4,337,137 | 6/1982 | Ezzell | 204/252 |
| 4,337,211 | 6/1982 | Ezzell et al. | 260/456 |
| 4,340,680 | 7/1982 | Asawa et al. | 521/27 |
| 4,358,412 | 11/1982 | Ezzell et al. | 260/968 |
| 4,358,545 | 11/1982 | Ezzell et al. | 521/27 |
| 4,382,123 | 5/1983 | Kimoto et al. | 521/27 |
| 4,399,009 | 8/1983 | Chisholm | 204/98 |
| 4,402,806 | 9/1983 | Coker et al. | 204/98 |
| 4,411,750 | 10/1983 | Silva et al. | 204/98 |
| 4,417,969 | 11/1983 | Ezzell et al. | 204/252 |
| 4,423,157 | 12/1983 | Masuda | 521/21 |
| 4,426,271 | 1/1984 | Yoshida et al. | 204/296 |
| 4,431,504 | 2/1984 | Seita et al. | 204/296 |
| 4,455,210 | 6/1984 | Coker et al. | 204/44 |
| 4,462,877 | 7/1984 | Ezzell | 204/98 |
| 4,470,889 | 9/1984 | Ezzell et al. | 204/98 |
| 4,478,695 | 10/1984 | Ezzell et al. | 204/98 |
| 4,490,484 | 12/1984 | Bissot et al. | 521/27 |
| 4,515,989 | 5/1985 | Ezzell et al. | 568/674 |
| 4,544,471 | 10/1985 | Silva et al. | 204/252 |
| 4,554,112 | 11/1985 | Ezzell et al. | 260/543 |
| 4,578,512 | 3/1986 | Ezzell et al. | 562/586 |
| 4,604,323 | 8/1986 | Johnson | 428/336 |
| 4,655,886 | 4/1987 | Oda et al. | 204/98 |
| 4,686,120 | 8/1987 | Johnson | 427/370 |
| 4,784,882 | 11/1988 | Birdwell et al. | 427/375 |
| 4,872,958 | 10/1989 | Suzuki et al. | 204/98 |
| 4,940,525 | 7/1990 | Ezzell et al. | 204/252 |
| 4,983,264 | 1/1991 | Miyake et al. | 204/98 |
| 5,246,792 | 9/1993 | Watanabe | 429/33 |

*Primary Examiner*—Kathryn L. Gorgos
*Assistant Examiner*—Kishor Mayekar

[57] ABSTRACT

A bilayer or trilayer composite ion exchange membrane suitable for use in a fuel cell. The composite membrane has a high equivalent weight thick layer in order to provide sufficient strength and low equivalent weight surface layers for improved electrical performance in a fuel cell. In use, the composite membrane is provided with electrode surface layers. The composite membrane can be composed of a sulfonic fluoropolymer in both core and surface layers.

14 Claims, No Drawings

COMPOSITE FUEL CELL MEMBRANES

STATEMENT OF GOVERNMENT INTEREST

This invention was made with the support of the United States Government under Contract DE-AC02-90CH10435 awarded by the Department of Energy. The Government has certain rights to this invention.

BACKGROUND OF THE INVENTION

1. Field of the Invention

This invention relates to composite ion exchange membranes useful in galvanic cells such as fuel cells.

2. Description of Related Prior Art

Sulfonic fluoropolymers containing ion exchange groups have been used widely in industry, particularly, as ion exchange membranes in chlor-alkali electrolytic cells and in other applications such as fuel cells and proton pumps. These membranes can be made from fluorinated polymers having ion exchange active groups or sites convertible to ion exchange active groups attached as pendent groups to the polymeric backbone. The fluoropolymers are usually thermoplastic and can be fabricated into films or sheets while in their molten form using mechanical extrusion equipment. Examples of multi-layer fluoropolymer film membranes prepared by molding the polymers are disclosed in U.S. Pat. Nos. 4,426,271; 4,123,336; 4,983,264; 4,544,471; and 4,411,750. Multi-layer composite film membranes can also be prepared by laminating individual films under heat and pressure as described in U.S. Pat. Nos. 4,253,923; 4,983,264; 4,544,471; and 4,411,750.

Such methods of fabrication can lead to problems of decomposition since molding, extrusion, and laminating mechanical equipment is usually operated in the temperature region near the crystalline melting point of the polymer which is commonly near the decomposition temperature of the polymer. Accordingly, there is disclosed in U.S. Pat. No. 4,784,882 a method of forming multi-layered composite ion exchange active fluoropolymer films suitable for use in electrolytic cells utilizing certain perhalogenated dispersants for use in forming dispersions from which films can be cast. The subsequent application of succeeding films is achieved subsequent to air drying and sintering the previously cast film.

For effective utilization of fluoropolymer ion exchange active film membranes, the physical integrity of the fluoropolymers is an important consideration. The physical integrity of ionic fluoropolymer films is determined largely by the amount of water or solvent the fluoropolymers contain. Thus, a sulfonic fluoropolymer that swells excessively because it absorbs substantial amounts of water or solvent tends to become gel-like and loose much of its physical integrity relative to an unswollen ionic fluoropolymer film. The level of swelling and the level of water absorption is largely determined by the temperature and the environment. For example, pure water at a given temperature will swell the ionic fluoropolymer more than aqueous salt-containing electrolytes which, in turn, swell the ionic fluoropolymers more than humid gases. However, increasing the temperature results in increased swelling and water absorption in each environment referred to above. Therefore, a single definition of suitable physical characteristics of an ionic fluoropolymer in order to define its usefulness is difficult to state since the utility of the ionic fluoropolymer film depends largely upon the environment in which it is used. Generally, the prior art workers have considered that electrolytic cell membranes for the electrolysis of sodium chloride are useful if characterized as having equivalent weights of about 800 to about 1500 as disclosed in U.S. Pat. Nos. 4,358,545; 4,417,969; and 4,478,695.

Other composite ion exchange membranes are disclosed in U.S. Pat. Nos. 4,337,137 and 5,246,792. In U.S. Pat. No. 5,246,792 a structure of an ion exchange composite membrane is disclosed in which an ion-conductive thin layer having a thickness of 5 microns is bonded to an ion exchange membrane having a thickness of 200 microns. The thin layer has a lower glass transition temperature during the bonding process than that of the membrane having a thick layer. The thickness of the thin layer can be between 0.01 to 20 microns. It is noted that the thick layer membrane of the composite when used as an ion exchange membrane in a fuel cell is arranged so as to face the cathode of the fuel cell.

U.S. Pat. No. 5,246,792 is directed, generally, to composite ion exchange membranes for use in an electrochemical fuel cell. Rather than define the composite membrane layers in terms of their equivalent weight, the layers are defined in terms of glass transition temperature. The glass transition temperature of the polymer forming the layers of the composite membrane is directly proportional to equivalent weight of the polymer. It is noteworthy that the teaching of the '792 patent with respect to orientation of a bilayer composite membrane is to place the thick layer, having a higher glass transition temperature, facing the cathode of the fuel cell. Such an orientation of the composite membrane is opposite to the orientation desired for the composite bilayer membrane of the invention which is oriented so as to obtain improved fuel cell potential by placing the lower equivalent weight layer facing the cathode.

In U.S. Pat. No. 4,337,137, a composite ion exchange membrane comprised of at least two layers is disclosed. The layers can have equivalent weights which differ from each other by less than 150. Useful equivalent weights for the membranes in chlor-alkali cells are not below about 800 to about 1100. It is noted that the abstract provides that the higher equivalent weight layer of the composite faces the cathode in an electrolytic cell so as to provide a barrier layer to back migration of hydroxyl ions.

Another factor in defining the usefulness of a sulfonic fluoropolymer as a membrane in an electrochemical cell for the production of chlorine and an alkali metal hydroxide is electrical conductivity and the ability to reject ions. Thus, a sulfonic fluoropolymer chosen for such use is usually selected based upon a balance between the electrical conductivity of the sulfonic fluoropolymer, which is affected by both the equivalent weight and the water absorption characteristics of the polymer and the ability of the sulfonic fluoropolymer to reject hydroxide ions, a property largely determined by the level of hydration of the polymer. That is, the degree of hydration per functional group in the sulfonic fluoropolymer. In order to minimize the passage of hydroxide ions, a sulfonic fluoropolymer is selected having a higher equivalent weight than would be required based merely upon electrical conductivity of the fluoropolymer alone. The selection of a sulfonic fluoropolymer is determined by the swelling characteristics of the polymer rather than the high ionic conductivity of the polymer, within the limitations of maintaining the physical integrity of the polymer. With respect to the use of sulfonic fluoropolymers in fuel cells and proton pumps, entirely different chemical and physical requirements for the membrane apply as opposed to selection of sulfonic fluoropolymers for use in chlor-alkali electrolytic cells. The different physical conditions present in a fuel cell result in different levels of swelling of the sulfonic fluoropolymer than result in chlor-alkali electrolytic cell environments. The hot electrolytes present in chlor-alkali electrolytic cells are not present in fuel cells, accordingly, there is little, if any, requirement for rejection of negative ions. The primary requirement for a membrane for use in a fuel cell is the transport of protons at the lowest possible electrical resistance. This makes a sulfonic fluoropolymer having the lowest equivalent weight consistent with the maintenance of physical integrity the best choice. Such low equivalent weight sulfonic fluoropolymers are disclosed in U.S. Pat. No. 4,940,525.

It is known to use sulfonic fluoropolymer membranes in proton exchange membrane fuel cells. In a proton exchange membrane fuel cell, an anode electrode is positioned in an anode compartment and a cathode electrode is positioned in a cathode compartment. The two compartments are separated by a membrane that is capable of transferring protons between the two electrodes. In a fuel cell, a reactant, for example, hydrogen, is fed to the anode and a reactant, for example, oxygen, is fed to the cathode. Reactions occur at the anode and at the cathode, thereby producing electricity. Protons pass through the membrane between the anode and the cathode. A membrane having the ability to transfer a large number of protons and be physically and chemically stable during the operation of the fuel cell has been shown to be a sulfonic fluoropolymer membrane such as a Nafion® fluoropolymer film, as disclosed by R. J. Lawrance in *Interim Report New Membrane-Catalyst for Solid Polymer Electrolyte Systems*, a report prepared for the University of California, Los Alamos National Laboratory.

SUMMARY OF THE INVENTION

Fluoropolymer composite ion exchange membranes having at least two layers have been found useful as fuel cell membranes. A perfluorinated polymer thick film having an equivalent weight, generally, of about 800 to about 1500 Daltons can be laminated on at least one surface to a perfluorinated polymer thin film having an equivalent weight, generally, of about 600 to about 900 Daltons. Said thin film is lower in equivalent weight than said thick film. A difference in equivalent weight of the layers of 100 or more is, preferably, maintained between thick and thin films. When the composite is a bilayer membrane in a fuel cell, the thin layer faces the cathode of the fuel cell. Such fuel cell membranes have high current capacity and comparable strength over fluoropolymer membranes of the prior art having a single layer or membranes wherein a thin, lower equivalent weight layer faces the anode and a thick, higher equivalent weight layer faces the cathode in the fuel cell.

The composite ion exchange membranes of the invention have a thick film thickness, generally, of about 1 to about 15 mils and a thin film thickness, generally, of about 1 to about 15 microns. Both sides of the fluoropolymer composite membrane are ordinarily in contact with an electrocatalyst layer when utilized in a fuel cell.

DETAILED DESCRIPTION

The method of forming the composite ion exchange fluoropolymer fuel cell membranes of the invention is generally disclosed in U.S. Pat. No. 4,784,882. In this patent, a two layer composite fluoropolymer membrane is prepared by forming a dispersion of a first perfluorinated polymer, forming a film of this first perfluorinated polymer by depositing the dispersion onto a second perfluorinated polymer film, and by heating the two films for a time and at a temperature to fuse the two films to each other. The second film is formed by any means, for instance, extrusion or dispersion and solution casting. The method is applicable to the preparation of both a two and three layer fluoropolymer composite fuel cell membrane, as would be apparent to one skilled in the art.

Essentially, the method of preparing the composite fluoropolymer fuel cell membranes involves formation of a dispersion of a perfluorinated polymer containing sites convertible to ion exchange groups. In this dispersion, the polymer is at least partially dissolved in the dispersant and the remainder of the polymer is dispersed. The dispersants disclosed in U.S. Pat. No. 4,784,882 as suitable for use in the formation of dispersions of ion exchange fluoropolymers have the following characteristics: A boiling point of less than about 110° C., a density of about 1.55 to about 2.97 grams per cubic centimeter, and a solubility parameter of more than about 7.1 to about 8.2 Hildebrands. Preferably, the dispersant has a boiling point of about 30° C. to about 110° C.

The most preferred dispersants are 1,2-dibromotetrafluoroethane (commonly known as FREON™ 114 B 2) having the formula:

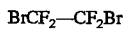

and 1,1,2-trichloro-1,2,2-trifluoroethane (commonly known as FREON™ 113) having the formula:

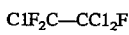

Of these two dispersants, 1,2-dibromotetrafluoroethane is the most preferred dispersant. It has a boiling point of about 47.3° C., a density of about 2.156 grams per cubic centimeter, and a solubility parameter of about 7.2 Hildebrands.

In practicing the present invention, the polymer to be used in the dispersion may be in any physical form. However, the polymer is preferably in the form of fine particles in order to speed dissolution and dispersion of the particles into the dispersant. Preferably, the particle size of the polymers is about 0.01 micron to about 840 microns. Most preferably, the particle size is less than about 250 microns.

To dissolve and disperse the polymer particles into the dispersant, the polymer particles are placed in contact with the dispersant of choice and intimately mixed. The first polymer and the dispersant may be mixed by any of several means including, but not limited to, shaking, stirring, milling or ultra sonic means. Thorough, intimate contact between the polymer and the dispersant are needed for optimum dissolution and dispersion.

The polymer used in the present invention is dissolved and dispersed into the dispersant at a concentration of about 0.1 to about 50 weight percent of polymer to dispersant. At concentrations below about 0.1 weight percent, there is insufficient polymer dissolved and dispersed to be effective as a medium for coating articles or forming films within a reasonable number of repetitive operations. Conversely, at concentrations above about 50 weight percent there is sufficient polymer present as a separate phase such that viable, coherent films and coatings of uniform structure cannot be formed without particulate agglomerates, etc.

Preferably, the concentration of the polymer in the dispersant is about 0.1 to about 20 weight percent. More preferably, the concentration of the polymer in the dispersant is about 0.3 to about 10 weight percent. Most preferably, the concentration is about 5 to about 15 weight percent.

The dispersion of the polymer into the dispersant can be conducted at room temperature conditions. However, the optimum dispersion effects are best achieved at temperatures of about 10° C. to about 50° C. At temperatures above about 50° C., the measures for dissolving and dispersing the polymer include mixing under pressure and a method of condensing the dispersants. At temperatures below about 10° C., the glass transition temperatures of many of the polymers used has not been reached, thus, causing difficulty in dispersion formation.

The dispersion of the polymer into the dispersant is best conducted at atmospheric pressure. However, dispersion can be achieved at pressures from about 760 to about 15,000 millimeters of mercury or greater. Pressures above about 760 millimeters mercury provide very little aid in dissolving and dispersing polymers compared to the difficulty and complexity of the operation. Experiments have shown that at about 20 atmospheres the amount of polymer dissolved and dispersed in the dispersant is not appreciably greater than the amount at atmospheric pressure.

After the polymer dispersions of the present invention have been formed into films, they may be fixed to other polymer films or substrates by sintering or compression. The following methods are suitable for fixing the polymer dispersion to another polymer film: (1) dipping a second polymer film into the dispersion, followed by air drying and sintering at the desired temperature with sufficient repetition to build the desired thickness; (2) spraying the dispersion onto a second polymer film in order to cover large or irregular shapes; (3) pouring the dispersion onto a second polymer film; and (4) painting the dispersion with brush or roller. In addition, coatings may be easily applied with metering bars, knives, or rods. Usually, the coating or films are built up to the thickness desired by repetitive drying and sintering.

A second polymer film upon which the dispersion is to be deposited may be cleaned or treated in such a way as to assure uniform contact with the dispersion but this is usually unnecessary. The second polymer film can be cleansed by washing with a degreaser or similar solvent followed by drying to remove any dust or oils. After being cleaned, the second polymer film may be pre-conditioned by heating or vacuum drying prior to contact with the dispersions and the coating operation. Temperatures and pressures in the following ranges are, preferably used: about 20 millimeters mercury at about 110° C. or thereabout is sufficient in all cases; however, mild heat is usually adequate, on the order of about 50° C. at atmospheric pressure. After preparation, the second polymer film is coated with the dispersion by any of several means described above. Then the dispersion may be evened out using scraping knives, rods, or other suitable means. The dispersion can be applied in a single step or in several steps depending on the concentration of the polymer in the dispersion and the desired thickness of the coating or film. Following the application of the dispersion, the dispersant is removed by any of several methods including, but not limited to, evaporation or extraction. Extraction is the use of some agent which selectively dissolves or mixes with the dispersant but not the polymer. These removal means should be employed until a uniform deposition of polymer is obtained and a continuous film is formed. The dispersant removal is typically carried out by maintaining the coated substrate at temperatures ranging from about 10° C. to about 110° C., with the preferred heating range being from about 20° C. to about 100° C. The heating temperature selected depends upon the boiling point of the dispersant. Heating temperatures are customarily in the range of from about 20° C. to about 50° C. for 1,2-dibromotetrafluoroethane. The pressures employed for the removal of the dispersant from the coated substrate can range from about 20 mm mercury to about 760 mm mercury depending on the nature of the dispersant, although pressures are typically in the range of from about 300 mm mercury to about 760 mm mercury for 1,2-dibromotetrafluoroethane.

The formation of the coating or film can be carried out as part of the polymer deposition and dispersant removal process or as a separate step by adjusting the thermal and pressure conditions associated with the separation of the polymer from the dispersant. If the dispersion is laid down in successive steps, a continuous film or coating free from pinholes can be formed without any subsequent heating above ambient temperature by control of the rate of evaporation. This can be done by vapor/liquid equilibrium in a container or an enclosure; therefore, the dispersant removal step can be merely a drying step or a controlled process for forming a coating or film. If the dispersant is removed as by flash evaporation, a film will not form without a separate heating step. After the dispersant has been removed, the residual polymer and substrate, as a separate step, is preferably subjected to a heat source of from about 50° C. to about 380° C. for times ranging from about 10 seconds to about 120 minutes, depending upon the thermoplastic properties of the polymers. The most preferred treatment temperatures are from about 270° C. to about 350° C. and a time of from about 0.2 to about 45 minutes for the most preferred polymers for use in the present invention. Such polymers form thin continuous films under the conditions described above. Composite films of varying layer thickness can be easily produced by the methods and means described above. Such films are suitable as membranes, and, when in their ionic forms, for use in electrochemical cells.

In the following description, fluoropolymers having ion exchange groups derived from sulfonic acid are disclosed. One skilled in this art will recognize that fluoropolymers having other ion exchange groups will be suitable for use in forming the composite membranes of the invention, for instance, fluoropolymers having carboxylic acid derived ion exchange groups.

Generally, any ion exchange fluoropolymer can be used in the composite membranes of the invention, preferably, sulfonic fluoropolymers having fluoropolymer backbones and 1–5 carbon atom pendent ion exchange groups attached thereto and terminating in a sulfonyl group are suitable for use in the present invention. Examples of such sulfonic ion exchange group fluoropolymers are illustrated, for example, in U.S. Pat. Nos. 4,578,512 (Mar. 25, 1986); 4,554,112 (Nov. 19, 1985); 4,515,989 (May 7, 1985); 4,478,695 (Oct. 23, 1984); 4,470,889 (Sep. 11, 1984); 4,462,877 (Jul. 31, 1984); 4,417,969 (Nov. 29, 1983); 4,358,545 (Nov. 9, 1982); 4,358,412 (Nov. 9, 1982); 4,337,211 (Jun. 29, 1982); 4,337,137 (Jun. 29, 1982); and 4,330,654 (May 18, 1982).

Representative independently selected ion exchange sulfonic fluoropolymers useful in forming both thick and thin composite membrane layers are disclosed in U.S. Pat. Nos. 4,478,695 and 4,940,525, each incorporated by reference herein. These polymers have equivalent weights of about 600 to about 1500 and are characterized by a substantially fluorinated polymer backbone and a recurring pendent group having the formula:

$$-O-(CFR)_a-(CFR')_b-SO_3M \qquad (I)$$

where a is 0 or an integer of 1–3, b is 0 or an integer of 1–3, a+b is at least 1, R and R' are independently selected from the group consisting of halogen, perfluoroalkyl, and fluorochloroalkyl, and M is independently selected from hydrogen or an alkali metal.

Other polymers useful in forming both thick and thin composite membrane layers are characterized by a substantially fluorinated polymer backbone and a recurring pendent group having the formula:

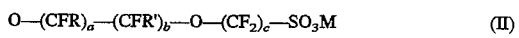

where a is 0 or an integer of 1–3, b is 0 or an integer of 1–3, c is an integer of 1–3, a+b is at least 1, R and R' are independently selected from the group consisting of perfluoroalkyl, and halogen, fluorochloroalkyl, and M is independently selected from hydrogen or an alkali metal.

Polymers having the above formulas are disclosed in U.S. Pat. Nos. 4,478,695; 4,417,969; 4,358,545; 4,940,525; 3,282,875; and 4,329,435.

The composite membranes of the invention have thick film thickness, generally, of about 1 to about 15 mils, preferably about 1 to about 10 mils, and, most preferably, about 2 to about 8 mils. Thin film thickness in the composite of the invention are, generally, about 1 to about 15 microns, preferably, about 1 to about 10 microns, and, most preferably, about 1 to about 5 microns.

Equivalent weights of polymers forming the thick layers of the composite membranes of the present invention are, generally, about 800 to about 1500 and, preferably, about 800 to about 1300. Equivalent weights of polymers forming the thin layers of the composite membranes of the invention are, generally about 600 to about 900, preferably about 600 to about 800. Thick and thin polymers are independently selected from Formulas I and II.

It is known that for sufficiently low equivalent weight, many ionomers become soluble in water, thereby compromising their strength and utility in a fuel cell. It is further known that ionomers with hydration per sulfonic acid functional group of 50 or less are generally not soluble in water. The preferred hydration per sulfonic acid group of the thin layer is about 50 or less. The preferred hydration per sulfonic acid group of the thick layer is about 30 or less. Hydration per sulfonic acid equivalent is determined by measuring the water absorption of a given weight of dry polymer. From this, the amount of water absorbed by the weight representing one sulfonic acid equivalent is determined and, thus, the moles of water per sulfonic acid equivalent.

A relationship between water absorption of the polymer and usefulness of the polymer as a membrane has long been recognized (W. G. F. Grot, et al., Perfluorinated Ion Exchange Membranes, 141st National Meeting The Electrochemical Society, Houston, Tex., May, 1972). Grot discloses that the capacity of the polymer to absorb water is a function of the equivalent weight, the history of pretreatment of the polymer and the electrolytic environment of the polymer. The equivalent weight is the weight of polymer which will neutralize one equivalent of base. A standard method of measuring water absorption for meaningful comparisons is given in Grot's paper (above). The method consists of boiling the polymer for 30 minutes in water with the polymer being the sulfonic acid form. The water absorbed by the polymer under these conditions is called the "Standard Water Absorption." The sulfonic acid membranes reported on in Grot's paper are polymers disclosed in U.S. Pat. No. 3,282,875.

After composite membrane preparation, conversion of the sulfonic fluoropolymer film membrane to an ionic form requires alkaline hydrolysis. The hydrolysis can be done in a variety of ways, but usually involves the use of caustic soda or potash in water, or a mixture of water and an organic solvent such as alcohols or dimethylsulfoxide. The sulfonic fluoropolymer may be converted to its ionic form by reacting it with 25 weight percent aqueous solution of NaOH under the following conditions:

(1) Immerse the sulfonic fluoropolymer in about 25 weight percent sodium hydroxide for about 16 hours at a temperature of about 90° C.

(2) Rinse the sulfonic fluoropolymer in deionized water heated to about 90° C. for about 30 to about 60 minutes.

The pendent group is then in the —$SO_3$—Na+ form. Cations other than —Na+ can be made to replace the Na+ if practical (such as H+ or K+). When used in a proton exchange membrane fuel cell, the pendent group is converted into the proton form. The equivalent weight of each film can be determined by precisely weighing an approximately 0.5 gram sample of dry acid form polymer, placing the sample in a large excess of 0.5 normal NaCl solution, heating the sample for 30 minutes at 50° C., cooling the sample to room temperature, and titrating the NaCl solution containing the polymer sample with a 0.005 normal NaOH solution. The equivalent weight of each film is then determined by dividing the weight of the polymer sample by the number of equivalents caustic consumed.

The following Examples illustrate the various aspects of the invention but are not intended to limit its scope. When not otherwise specified in the Specification and claims, temperatures are in degrees centigrade and parts, percentages, and proportions are by weight.

EXAMPLE 1

A copolymer of tetrafluoroethylene and $FSO_2CF_2CF_2OCF=CF_2$ having an equivalent weight of about 802 is prepared, generally, in accordance with the teaching of U.S. Pat. No. 4,940,525.

EXAMPLE 2

A copolymer of tetrafluoroethylene and $FSO_2CF_2CF_2OCF=CF_2$ having an equivalent weight of 982 is prepared, generally, in accordance with the teaching of U.S. Pat. No. 4,940,525.

EXAMPLE 3

A copolymer of tetrafluoroethylene and $FSO_2CF_2CF_2OCF=CF_2$ having an equivalent weight of about 1265 is prepared, generally, in accordance with the teaching of U.S. Pat. No. 4,940,525.

EXAMPLE 4

This Example illustrates the preparation of a sulfonic fluoropolymer having an equivalent weight of about 682.

A 5.5 liter glass-lined reactor equipped with an anchor agitator, paddle baffle, a platinum resistance temperature device, and a temperature control jacket is charged with about 21.2 grams ammonium perfluorooctanate, about 16.1 grams $Na_2HPO_4 \cdot 7H_2O$, about 13.2 grams $NaH_2PO_4 \cdot H_2O$, and about 8.5 grams of $(NH_4)_2S_2O_8$. The reactor is then evacuated down to about 0.0 psi (gauge) on the electronic pressure readout and then inert gas (nitrogen) is added to pressure up the reactor to about 65 psi gauge. This is done a total of four times, then the reactor is evacuated again. About 3800 grams of deoxygenated, deionized water is added, the agitator is started and heat is applied to the jacket. The agitator is set to about 500 rpm and then about 1000 grams of 2-fluorosulfonyl perfluoroethyl vinyl ether is added. With the temperature at about 59° C., tetrafluoroethylene (TFE) gas is fed to the reactor over a period of about five minutes to reach a pressure of about 135 psi gauge and that pressure is held for the reaction period of about 143 minutes. The feed is stopped and nitrogen is blown through the gas phase portion of the system and ambient-temperature water is added to the jacket. A total of about 850 grams of TFE gas is added to the reactor. The latex produced during the reaction is found to contain about 21.0 percent solids. The latex is weighed and found to be about 1000 grams after stripping of residual monomer. The latex is coagulated with concentrated nitric acid, filtered, and washed repeatedly with water, then vacuum dried at about 110° C. The equivalent weight is found to be about 682.

EXAMPLES 5-7

The polymers prepared in Examples 1-3 are used to dispersion cast polymer films for use as thick materials in the bilayer or trilayer membranes of the invention. The films are cast on a glass filled polytetrafluoroethylene web. The polymer prepared in Example 1 is cast with a film thickness of about 3.7 mils as the film of Example 5. The polymer prepared in Example 2 is cast at a thickness of 3.7 mils as the film of Example 6. The polymer prepared in Example 3 is cast with a film thickness of 2.0 mils as the film of Example 7.

EXAMPLE 8

A dispersion of the polymer prepared in Example 4 having a concentration of 4 percent by weight is made by mixing 96 grams of perfluorinated heptane with 4 grams of the polymer of Example 4. In order to effect dispersion, the mixture prepared is sealed in an air tight container and mixed at room temperature utilizing ultrasonic means for a period of four hours. After this time, the polymer is found to be uniformly dispersed in the perfluorinated heptane and could be readily cast into a film utilizing this dispersion.

EXAMPLES 9-11

The trilayer ion exchange membranes of the invention are prepared by placing films prepared in Examples 5-7 on a vacuum table with a stainless steel microscreen placed between the table and the cast film. A vacuum is applied to hold the sample firmly in place and then the dispersion prepared in Example 8 is uniformly spread over the film utilizing a number 20 Mayer rod. The coating is allowed to air dry and the vacuum table is then heated to a temperature of about 135°-155° C. and held for fifteen minutes. After the table is cooled to room temperature the bilayer membrane is inverted and the coating process repeated. After the second coating is air dried, the table is heated again to a temperature in the heating range described above. After the table is cooled the second time, the trilayer membrane is removed.

The trilayer membranes prepared in Examples 9-11 are protonated utilizing the following two step procedure:
(1) The membrane is heated in an aqueous 25 percent sodium hydroxide solution at a temperature of 90° C. for 16 hours. This converts the membrane to the sodium ion form.

(2) Thereafter, the membrane is washed in water and immersed in a three N sulfuric acid solution for 2-4 hours at a temperature of 25° C. in order to convert the membrane to the protonated form.

Thereafter, the membranes are hydrated by washing in deionized water and subsequently boiled in water. The trilayer membranes prepared have dry film thicknesses and equivalent weights as follows:

EXAMPLES 12-14

These Examples illustrate the preparation of membrane and electrode assemblies utilizing the trilayer membranes prepared in Examples 9-11. A catalyst composition made up of 85 percent by weight platinum black and 15 percent by weight of

| Example | Thick Layer (mils) | Thick Layer Eq. Wt. | Thin Layer (micrometers) | Thin Layer Eq. Wt. |
| --- | --- | --- | --- | --- |
| 9 | 3.7 | 802 | 2.5-2.4 | 682 |
| 10 | 3.7 | 982 | 2.5-1.9 | 682 |
| 11 | 2.0 | 1265 | 5.8-1.7 | 682 | polytetrafluoroethylene (PTFE) powder is applied to a carbon paper support that has been previously treated with PTFE. This support is prepared by adding 4.5 percent by weight of PTFE and, thereafter, heating at 335° C. for 1 hour to sinter the PTFE component. The carbon support and the applied catalytic layer are heated at 335° C. for an additional 1 hour to sinter the PTFE in the catalytic layer. The loading of platinum is 4 mg/cm$^2$. Subsequently, the catalyst composition is laminated to the trilayer membranes utilizing a press at a load of 500 pounds per square inch and a temperature of between 160° C. to 175° C.

EXAMPLES 15-17 (Controls, forming no part of this invention)

Membrane and electrode assemblies having a single layer membrane are prepared utilizing the cast films prepared in Examples 5-7 first protonated in accordance with the procedure of Examples 9-11 and then followed by the application of the anode and cathode electrodes in accordance with the procedure described in Examples 12-14.

Each of the composite trilayer membrane and electrode assemblies prepared in Examples 12-14 are evaluated in a fuel cell for performance against control Examples 15-17. The fuel cells are operated by supplying gaseous hydrogen to the anode and an oxidant, preferably, gaseous oxygen or air, to the cathode. The gaseous hydrogen diffuses through the electrode structure, thereby coming in contact with the catalyst layer bonded to the ion exchange membrane surface. The hydrogen is oxidized so as to generate protons and electrons. The oxygen entering the cathode contacts the catalyst layer bonded to the cathodic side of the ion exchange trilayer membrane and electrode assembly and is, thereby, reduced. The potential difference generated at the two electrodes as a result of the reactions taking place creates a driving force for the transport of protons through the ion transporting ion exchange membrane. A proton and a reduced oxygen species combine as they come in contact at the catalyst layer on the ion exchange membrane. The result of this reaction is the generation of a voltage at the terminals of the cathode and the anode. In fuel cells, the higher the voltage, the higher the cell efficiency.

In these Examples, the cell is supplied with 40 pounds per square inch gage of oxygen and 30 pounds per square inch gage of hydrogen. The temperature of operation of the fuel cell is 75° C. In all experiments, the fuel feed was two times stoichiometric. The results of evaluation in a fuel cell show that the trilayer prepared in Example 12 having an 802 equivalent weight thick layer and thin coatings having an equivalent weight of 682, prepared from the dispersion described in Example 8, provided an approximately 25 millivolt performance advantage over the membrane and electrode assembly of Control Example 15 having an 802 equivalent weight over the current density range of 0.1–0.6 A/cm$^2$.

Test results in a fuel cell in accordance with the procedure described above of the trilayer membrane and electrode assembly prepared in Examples 13 and 14 in comparison with the single layer membrane and electrode assembly prepared in Control Examples 16 and 17, similarly, indicates a performance advantage of the trilayer membrane assembly.

EXAMPLE 18

A trilayer membrane of the invention is prepared by placing a film of NAFION® 115 having a thickness of 5 mils, an equivalent weight of 1100, and a glass transition temperature of 105° C. between two frames having an inner dimension of 4.5 inches by 5.5 inches so that the NAFION® 115 film is held tightly within the frame. The frame is then dipped into the dispersion prepared in Example 8 and slowly drawn out of the dispersion at the rate of approximately 0.2 inches per second. The coating is allowed to air dry and the frame holding the composite membrane is placed successively in a vacuum oven at 70° C. for ten minutes and a standard oven at 195° C. for two minutes. The composite membrane is removed from the frame after cooling to room temperature and is protonated using the two step procedure described following Examples 9–11. The composite membrane has a dry thickness of about 5.2 mils and thin outer layers having thicknesses of 6 and 7.3 microns. The anode and cathode electrodes are applied to the trilayer membrane in accordance with the procedure described in Examples 12–14.

EXAMPLE 19 (Control forming no part of the invention)

A membrane and electrode assembly having a single layer membrane of NAFION® 115 is prepared using a NAFION® 115 film first protonated in accordance with the procedure described in Examples 9–11. Membrane and electrode assemblies are formed from these membranes in accordance with the procedure described in Examples 12–14.

EXAMPLE 20

The composite trilayer membrane electrode assembly of Example 18 is evaluated in a fuel cell for performance against Control Example 19 in accordance with the procedure described following Examples 15–17. The membrane of Example 18 provided approximately 18 millivolts performance advantage over the membrane and electrode assembly of Control Example 19 over the current density range of 0.1–1.2 A/cm$^2$.

EXAMPLE 21

A trilayer composite layer of the invention is formed in accordance with the procedure described in Example 18 except that the thick layer has an equivalent weight of 1190 and the composite film membrane is heated at 220° C. after removal from the vacuum oven.

EXAMPLE 22

A bilayer composite membrane of the invention is formed in accordance with the procedure described in Example 18 except that the thick layer has an equivalent weight of 1190 and in order to form a bilayer composite membrane, the thick layer is placed adjacent to a glass filled polytetrafluoroethylene film prior to clamping the thick layer in the frame. In this way, the dispersion of Example 8 is allowed to contact only one surface of the thick layer when the frame is dipped into the dispersion.

EXAMPLES 23 & 24

The composite membranes of Examples 21 and 22 are each protonated in accordance with the procedure described following Examples 9–11 and membrane and electrode assemblies are formed from these membranes in accordance with the procedure described in Examples 12–14 using electrode and membrane lamination conditions of about 140° C. and about 975 pounds per square inch.

EXAMPLE 24A (Control forming no part of the invention)

A membrane and electrode assembly having a single layer membrane of 1190 equivalent weight is prepared using a film first protonated in accordance with the procedure described in Examples 9–11. Membrane and electrode assemblies are formed from these membranes in accordance with the procedure described in Examples 12–14 using lamination conditions of about 140° C. and 975 pounds per square inch.

EXAMPLES 25–27

The membrane and electrode assemblies of Examples 23, 24, and 24A are tested in a fuel cell in accordance with the procedure described following Examples 15–17. The membrane and electrode assembly of Example 24, a bilayer membrane, was tested twice. In one test, the thin layer was placed facing the cathode of the fuel cell and in the second evaluation, the thin layer was placed facing to the anode of the fuel cell. Over a current density range of 0.1–1.2 A/cm$^2$, the trilayer composite of Example 23 and the bilayer composite of Example 24 with the thin layer placed facing the cathode of the fuel cell performed approximately 25 millivolts better than the prior art single layer membrane of Example 24A. Over the current density range of 0.1–1.2 A/cm$^2$ the bilayer composite of Example 24 oriented with the thin layer adjacent the anode of the fuel cell performed approximately the same as the prior art single layer membrane of Example 24A. It is noted that the orientation of the bilayer composite membrane is important. When the high equivalent weight thick layer faces the cathode of the fuel cell, in accordance with the teaching of U.S. Pat. No. 5,246,792, the composite membrane provides no advantage in fuel cell performance. When the low equivalent weight layer of the composite membrane is placed facing the cathode of the fuel cell, in accordance with the teaching of the present invention, a fuel cell performance advantage is demonstrated.

EXAMPLE 28

A bilayer membrane of the invention is prepared by placing a film having a thickness of 5 mils of NAFION® 115, an equivalent weight of 1100 and a glass transition temperature of about 105° C. upon a vacuum table with a stainless steel microscreen placed between the table and the film. A vacuum is applied to hold the sample firmly in place and then the dispersion prepared in Example 8 is uniformly spread over the film utilizing a number 20 Mayer rod. The coating is allowed to air dry and the vacuum table is then heated to a temperature of about 135° C. to about 155° C. and held at this temperature for 15 minutes. The table is then cooled to room temperature and the bilayer composite membrane is removed and, thereafter, protonated using the two step procedure set forth in Examples 9–11. Thereafter, the bilayer membrane is hydrated by washing in deionized water and subsequently boiled in water. The bilayer membrane of Example 31 has a thin layer of about 5 microns in thickness.

EXAMPLE 29

Using the bilayer composite prepared in Example 28, a catalyst is embedded in the surface of the thin membrane layer having an equivalent weight of 682 by applying a catalyst composition on the surface of the membrane as described in Examples 12–14. The catalyst composition is similar to that described in preparing membrane and electrode assemblies described in Examples 12–14.

EXAMPLE 30 (Control, forming no part of this invention)

Using a film of NAFION® 115 having a film thickness of 5 mils, an equivalent weight of 1100, and a glass transition temperature of 105° C., a single layer membrane and electrode assembly is prepared in the same manner as described in Examples 12–14.

Comparison of the bilayer membrane and electrode assembly prepared in Example 29 with the single layer membrane and electrode assembly prepared in Example 30 is made by evaluating the membrane and electrode assemblies in a fuel cell in accordance with the procedure described in Examples 15–17. The thin film layer of the composite faces the cathode of the fuel cell.

Test results for the membrane and electrode assemblies in a fuel cell in accordance with this procedure indicate a performance advantage of the bilayer membrane and electrode assembly of Example 29 in comparison with the single layer membrane and electrode assembly of Control Example 30.

EXAMPLE 31 (Control, forming no part of this invention)

A bilayer composite membrane similar to the bilayer prepared in Example 28 is prepared except that onto one surface of the thick layer of NAFION® 115 having a glass transition temperature of 105° C. and 1100 equivalent weight a dispersion of the polymer of Example 8 is applied. This polymer has a glass transition temperature of 130° C. and an equivalent weight of 682. The total thickness of the composite is 205 microns with the thick layer composed of NAFION® 115 having a film thickness of 200 microns. The membrane composite is protonated as described in Examples 9–11, a catalyst is applied as described in Examples 12–14, and the composite is evaluated for performance in a fuel cell as described in Examples 15–17 with the thick film layer of Nafion® 115 oriented in the direction of the cathode of the fuel cell. Example 31 provides inferior performance in comparison with Example 29 and similar performance to Example 30.

EXAMPLE 32 (Control, forming no part of this invention)

A bilayer composite membrane is prepared in accordance with the procedure described in Examples 9–11 utilizing the polymer prepared as described in Example 3 having an equivalent weight of 1265 and a glass transition temperature of about 200° C. A film is applied to one surface thereof utilizing the dispersion described in Example 8 so as to apply a coating of a polymer having an equivalent weight of 682 and a glass transition temperature of about 130° C. The total overall film thickness of the composite membrane was about 55 microns. The polymer film of Example 3 has a film thickness of 50 microns. The composite membrane of Example 32 is protonated in accordance with the procedure described in Examples 9–11 and a catalyst layer is applied to each surface of the composite bilayer membrane in accordance with the procedure of Examples 12–14. When tested in a fuel cell in accordance with the procedure described in Examples 15–17 with the thick film of the composite facing the cathode, Example 32 shows no performance advantage over Example 17 and is inferior in performance to Example 14.

While this invention has been illustrated by reference to certain specific embodiments, it will be recognized by those skilled in the art that many variations are possible without department from the scope and state of the invention, and it will be understood that it is intended to cover all changes and modifications of the invention disclosed herein for the purpose of illustration which do not constitute departures from the spirit and scope of the invention.

What is claimed is:

1. A proton exchange membrane fuel cell comprising a composite perfluorinated polymer ion exchange membrane comprising a thick fluoropolymer film having an equivalent weight of about 800 to about 1500, a thickness of about 1 to about 15 mils and laminated on at least one surface thereof, a thin fluoropolymer film having an equivalent weight of about 600 to about 900 and a thickness of about 1 to about 15 microns, wherein said thin film is lower in equivalent weight than said thick film and said thin fluoropolymer film faces a cathode of said fuel cell.

2. The proton exchange membrane fuel cell of claim 1 wherein said thick and thin films consist of independently selected polymers having a substantially fluorinated backbone and recurring pendent groups having the formulas:

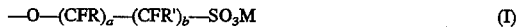

$$-O-(CFR)_a-(CFR')_b-SO_3M \quad (I)$$

and

$$-O-(CFR)_a-(CFR')_b-O-(CF_2)_c-SO_3M \quad (II)$$

where a is 0 or an integer of 1–3, b is 0 or an integer of 1–3, c is an integer of 1–3, a+b is at least 1, M is independently selected from hydrogen or an alkali metal, and R and R' are independently selected from halogen, perfluoroalkyl, and fluorochloroalkyl.

3. The fuel cell of claim 2 wherein the films have a degree of hydration per sulfonic acid group of about 50 or less.

4. The fuel cell of claim 3 wherein said composite membrane consists of a trilayer or bilayer membrane with thick and thin films consisting of a polymer having pendent groups of Formula I and the difference between the equivalent weight of said thick film and said thin film is 100 or more.

5. The fuel cell of claim 3 wherein said composite membrane consists of a trilayer or bilayer membrane with thick and thin films consisting of a polymer having pendent groups of Formula II and the difference between the equivalent weight of said thick film and said thin film is 100 or more.

6. The fuel cell of claim 3 wherein said composite membrane is a trilayer or bilayer membrane with a thick film consisting of a polymer having pendent groups of Formula II and a thin film or films consisting of a polymer having pendent groups of Formula I and the difference between the equivalent weight of said thick film and said thin film or films is 200 or more.

7. The fuel cell of claim 2 wherein said composite fluoropolymer ion exchange membrane consists of said thick fluoropolymer film having a thickness of about 2 to about 8 mils and said thin fluoropolymer having a thickness of about 1 to about 15 microns.

8. A process for operating a proton exchange membrane fuel cell comprising feeding fuel to an anode of said fuel cell and feeding an oxidant to a cathode of said fuel cell wherein said anode and cathode are separated by a proton exchange perfluorinated polymer composite film membrane comprising a perfluorinated polymer thick film and at least one perfluorinated polymer thin film laminated on at least one surface thereof wherein said thick film has an equivalent weight of about 800 to about 1500 and a thickness of about 1 to about 15 mils, said thin film has an equivalent weight of about 600 to about 900 and a thickness of about 1 to about 15 microns, wherein said thin film is lower in equivalent weight than said thick film, and said thin film faces said cathode of said fuel cell.

9. The process of claim 8 wherein said thick and thin films comprise independently selected polymers having a substantially fluorinated backbone and recurring pendent groups having the formulas:

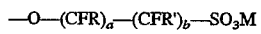 (I)

and

 (II)

where a is 0 or an integer of 1–3, b is 0 or an integer of 1–3, c is an integer of 1–3, a+b is at least 1, M is independently selected from hydrogen or an alkali metal, and R and R' are independently selected from halogen, perfluoroalkyl, and fluorochloroalkyl.

10. The process of claim 9 wherein the films have a degree of hydration per sulfonic acid group of about 50 or less.

11. The process of claim 10 wherein said composite film membrane is a trilayer or bilayer membrane with thick and thin films consisting of a polymer having pendent groups of Formula I and the difference between the equivalent weight of said thick film and said thin film is 100 or more.

12. The process of claim 10 wherein said composite film membrane is a trilayer or bilayer membrane with thick and thin films consisting of a polymer having pendent groups of Formula II and the difference between the equivalent weight of said thick film and said thin film is 100 or more.

13. The process of claim 10 wherein said composite film membrane is a trilayer or bilayer membrane with a thick film consisting of a polymer having pendent groups of Formula II and a thin film films consisting of a polymer having pendent groups of Formula I and the difference between the equivalent weight of said thick film and said thin film or films is 200 or more.

14. The process of claim 9 comprising said thick film having a thickness of about 2 to about 8 mils and said thin film having a thickness of about 1 to about 15 microns.

* * * * *